Feb. 15, 1966          J. E. LYON          3,234,813

EMERGENCY BRAKE FOR POWER SWEEPERS AND OTHER VEHICLES

Original Filed Dec. 28, 1961          2 Sheets-Sheet 1

INVENTOR.
JAMES E. LYON
BY
*Owen + Owen*
ATTORNEYS

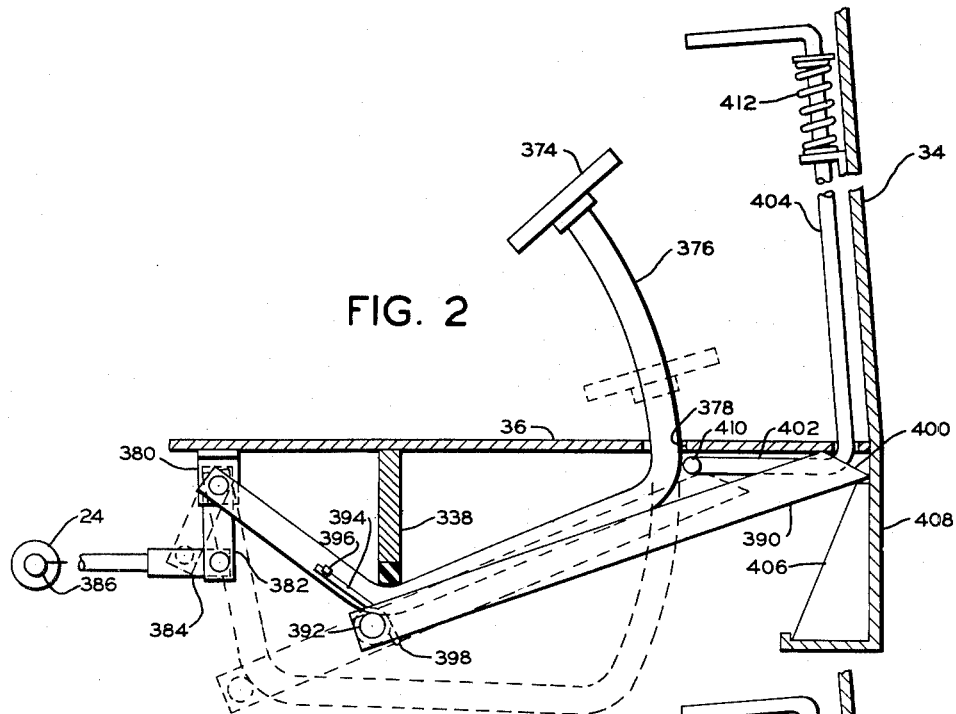

United States Patent Office 3,234,813
Patented Feb. 15, 1966

3,234,813
EMERGENCY BRAKE FOR POWER SWEEPERS AND OTHER VEHICLES
James E. Lyon, Perrysburg, Ohio, assignor to American Lincoln Corporation, Toledo, Ohio, a corporation of Ohio
Original application Dec. 28, 1961, Ser. No. 162,678. Divided and this application July 27, 1964, Ser. No. 395,632
4 Claims. (Cl. 74—535)

This is a division of application Serial No. 162,678, filed December 28, 1961.

This invention relates to an improved emergency brake and more particularly to an emergency brake for a power sweeper of the riding type which is especially designed to sweep factory and institutional floors and similar large surfaces.

The new sweeper is provided with a simple and easily-operated emergency brake which facilitates operation of the sweeper.

It is, therefore, a principal object of the invention to provide an improved power sweeper.

Still another object of the invention is to provide a power sweeper with an emergency brake which is easier to operate.

Many other objects and advantages of the invention will be apparent from the following detailed description of a preferred embodiment thereof, reference being made to the accompanying drawings, in which:

FIG. 2 is a view in vertical cross section of an emergency brake mechanism, with one position of the mechanism being shown in dotted lines; and FIG. 3 is a view similar to FIG. 2 but with the mechanism being shown in still a different position.

Figure 1:
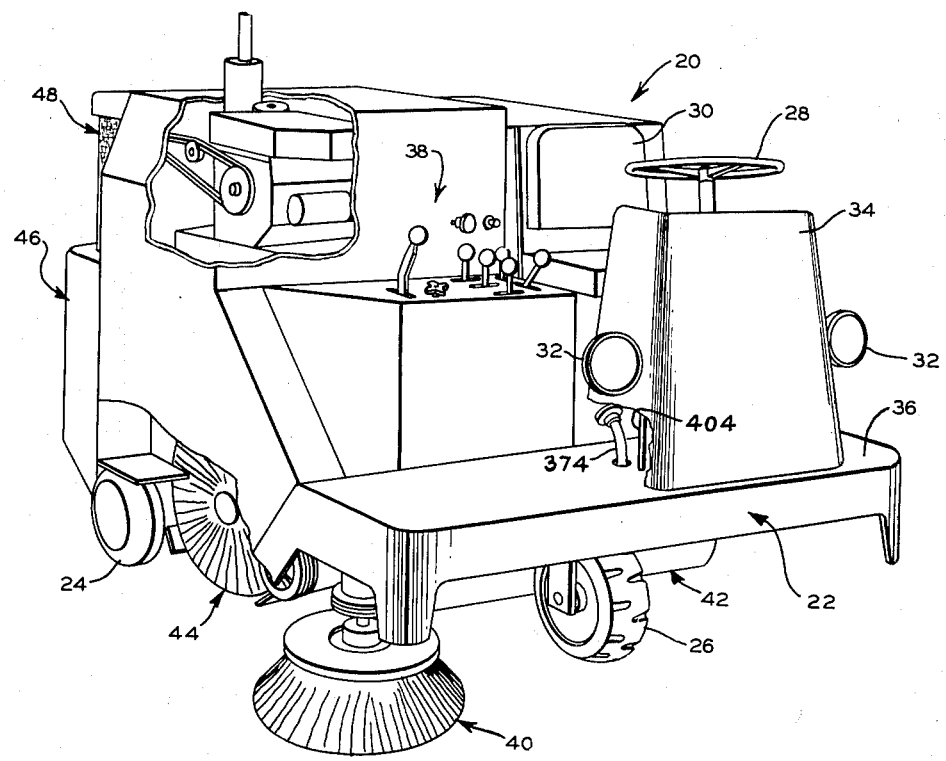
FIG. 1 is an overall view in perspective of a riding-type power sweeper embodying the principles of the present invention.

Referring to the drawings, and more particularly to FIG. 1, an overall power sweeping machine embodying the principles of the present invention is indicated by the numeral 20. The sweeper 20 includes a main frame or body 22 supported on a pair of driven, rear wheels 24 and a single, centrally located front wheel 26. The front wheel 26 is steered through suitable mechanism associated with a steering wheel 28 located in front of an operator's seat 30.

The sweeper 20 also includes a pair of headlights 32 which are particularly useful when factory aisles and similar other dark areas are being cleaned, the headlights 32 being mounted on an operator's panel 34. The panel 34 is supported on a deck 36 which constitutes part of the frame 22 with suitable foot controls being located just above the deck 36 behind the panel 34 for controlling the drive for the rear wheels 24 and also for stopping the sweeper. These controls can be of any suitable design, as is known in the art, and will not be discussed in any detail, except for a brake of the sweeper 20. To one side of the operator's seat 30 is a control board generally indicated at 38 containing a plurality of levers for controlling various elements of the sweeper 20 including the wheel transmission.

A side broom 40 is located under the front, right corner of the sweeper 20, this broom enabling the sweeper to clean closely to a wall or curb, for example, with the broom 40 sweeping the dirt toward the center of the sweeper 20. The sweeper can also be supplied with a similar side broom at the front, left corner, if desired.

The dirt swept to the center of the sweeper 20 by the broom 40, as well as other dirt passing under the sweeper 20, passes under a front flap 42 and is picked up by a main broom 44. The main broom 44 carries this dirt into a hopper 46 in which heavier dirt and debris is deposited, with lighter dirt particles being eventually passed through a plurality of filter bags 48 which collect the remaining dirt and allow the air to pass to the atmosphere. The dirt collected in the filter bags 48 can then be separated and removed by a novel shaker system, to be discussed later, and the hopper 46 can be unloaded by a novel dumping system, also to be discussed later.

Referring to FIGS. 2 and 3, the sweeper 20 is equipped with a parking brake device which is both inexpensive and efficient, as well as being relatively maintenance free. The brake mechanism includes a brake pedal 374 located above the deck 36 and attached to a generally L-shaped brake lever 376 which extends through a hole 378 in the deck 36 and is pivotally mounted to an ear 380 located therebelow to the rear of the pedal 374. A short brake arm 382 is rigidly affixed to the brake lever 376 and moves therewith as the pedal 374 is depressed. The arm 382 is connected to a brake rod 384 which sets brakes 386 of the rear wheels 24 when the arm 382 is moved to the rear position (as shown by dotted lines in FIG. 2). The brake lever 376 moves upwardly against a stop member 338 when the pedal 374 is released. To this point, the brake mechanism operates in a conventional manner.

A dependable yet simple parking brake is provided in association with the brake lever 376. Accordingly, a pointed parking brake bar 390 is pivotally attached by a pin 392 to an intermediate point of the brake lever 376. The bar 390 is urged upwardly by a torque spring 394 which is wrapped at least once around the pivot pin 392 with an upper end held by a projection 396 on the lever 376 and with a lower end forming a hook 398 extending under the lower edge of the bar 390 and urging the bar in a counterclockwise direction around the pivot pin 392. The spring 394 thus keeps the bar 390 in an upper position with an upper, pointed end 400 thereof riding under the deck 36 and, more specifically, under an L-shaped portion 402 of a parking brake handle 404. Thus, in normal operation of the brake pedal 374 and the brake lever 376, the bar remains in an upper position as shown in full and dotted lines in FIG. 2, and does not have any effect on the operation of the brake.

The parking brake handle 404 cannot be pushed downwardly when the brake lever 376 and pedal 374 are in their upper positions, because the pointed end 400 of the bar 390 will simply abut the top of a soft steel inclined block 406 which is suitably supported below the deck 36 by a bracket 408. However, when the brake lever 376 is depressed, and the brake bar 390 is moved to the position indicated in dotted lines in FIG. 2, the brake handle 404 can be pressed downwardly which causes a leg 410 of the L-shaped portion 402 to push the bar 390 downwardly until the pointed end 400 engages the surface of the block 406, the point 400 being of hardened steel. When the pedal 374 is then released, the point 400 will dig into the block 406 and hold the lever 376 in the depressed position with the brakes 386 remaining set. The brake handle 404 is released when downward pressure is placed on the pedal 374 with a spring 412 returning the handle 404 to the upper position, with the L-shaped portion 402 lying immediately under the deck 36. The pressure on the pedal 374 moves the pivot pin 392 slightly toward the rear to retract the bar 390 from the block 406. The torque spring 394 then moves the bar 390 to its upper position again and the brakes can function in the usual manner.

Various modifications of the above-described embodiment of the invention will be apparent to those skilled in the art and it is to be understood that such modifications can be made without departing from the scope of the invention, if within the spirit and tenor of the accompanying claims.

What I claim is:

1. In combination, a frame, a brake lever pivotally attached to said frame, a brake arm affixed to said brake lever, a brake-actuating rod extending from an end of said brake arm, said brake rod being effective to actuate a brake when said rod is moved by said brake arm when said brake lever is depressed, a pointed parking brake bar pivotally attached to an intermediate point on said brake lever, a torque spring mounted at the brake bar pivot and urging said brake bar upwardly, a block with an inclined surface mounted on said frame in alignment with said brake bar, said block being made of a relatively soft material compared to said brake bar, a parking brake handle mounted on said frame in alignment with said brake bar and being effective to push said brake bar into engagement with said block when said brake lever is depressed, whereby when said brake lever is released, said brake bar engages said block and prevents said lever from returning to its upper, non-depressed position.

2. In combination, a frame, a brake lever pivotally attached to said frame, a brake arm affixed to said brake lever, a brake-actuating rod extending from an end of said brake arm, said brake rod being effective to actuate a brake when said rod is moved by said brake arm when said brake lever is depressed, a parking brake bar having a pointed end pivotally attached to an intermediate point on said brake lever, means on said frame presenting an engageable surface with the pointed end of said brake bar, a torque spring mounted at the brake bar pivot and urging said brake bar upwardly away from said surface, a parking brake handle mounted on said frame in alignment with said brake bar and being effective to push said brake bar into engagement with said block when said brake lever is depressed, whereby when said brake lever is released, said brake bar engages said block and prevents said lever from returning to its upper, non-depressed position.

3. In combination, a frame, a brake lever pivotally attached to said frame, a brake arm affixed to said brake lever and movable therewith, a brake-actuating rod extending from said brake arm, said brake rod being effective to actuate a brake when said rod is moved by said brake arm when said brake lever is depressed, a pointed parking brake bar pivotally attached to an intermediate point on said brake lever, a block with an inclined surface mounted on said frame in alignment with said brake bar, said block being made of relatively soft material compared to said brake bar, means engageable with said brake bar for urging said bar away from said block, and means engageable with said brake bar effective to move said brake bar into engagement with said block.

4. In combination, a frame, a brake lever pivotally attached to said frame, a brake arm affixed to said brake lever and movable therewith, a brake-actuating rod extending from said brake arm, said brake rod being effective to actuate a brake when said rod is moved by said brake arm when said brake lever is depressed, a pointed parking brake bar pivotally attached to an intermediate point on said brake lever, a block with an inclined surface mounted on said frame in alignment with said brake bar, said block being made of relatively soft material compared to said brake bar, and means engageable with said brake bar and movable independently of said brake lever to release said brake bar from engagement with said block after said bar is engaged with said inclined surface and downward pressure is placed on said brake lever.

References Cited by the Examiner

UNITED STATES PATENTS

| | | | |
|---|---|---|---|
| 1,497,509 | 6/1924 | Huffman | 74—542 |
| 1,840,960 | 1/1932 | Krueger | 188—265 |
| 2,504,258 | 4/1950 | Elenewicz | 74—542 |
| 2,812,669 | 11/1957 | Reff | 74—532 |

MILTON BUCHLER, *Primary Examiner.*

DUANE A. REGER, *Examiner.*